(12) United States Patent
Li et al.

(10) Patent No.: US 9,904,403 B2
(45) Date of Patent: Feb. 27, 2018

(54) RF EMISSION SPECTRUM RANDOMIZATION AND TARGETED NULLING FOR AN ELECTRONIC DEVICE

(71) Applicant: SYNAPTICS INCORPORATED, San Jose, CA (US)

(72) Inventors: Zheming Li, San Jose, CA (US); Steve Chikin Lo, Sunnyvale, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 93 days.

(21) Appl. No.: 14/788,712

(22) Filed: Jun. 30, 2015

(65) Prior Publication Data

US 2017/0005572 A1    Jan. 5, 2017

(51) Int. Cl.
| | |
|---|---|
| H02M 3/07 | (2006.01) |
| G06F 3/044 | (2006.01) |
| G06F 3/041 | (2006.01) |
| H02M 1/44 | (2007.01) |
| H02M 1/00 | (2006.01) |

(52) U.S. Cl.
CPC ............ G06F 3/0416 (2013.01); G06F 3/044 (2013.01); H02M 3/07 (2013.01); H02M 1/44 (2013.01); H02M 2001/0035 (2013.01); Y02B 70/16 (2013.01)

(58) Field of Classification Search
CPC ...... G06F 3/0416; G06F 3/044; G06F 3/0412; G06F 3/0383; H02M 3/07; H04L 9/0662; H04L 7/043; H03M 13/00; H03M 13/25; H04B 1/69; H04B 1/0475; H04J 3/0611
See application file for complete search history.

(56) References Cited

U.S. PATENT DOCUMENTS

| | | | |
|---|---|---|---|
| 6,107,862 A * | 8/2000 | Mukainakano | H02M 3/07 327/536 |
| 6,369,642 B1 | 4/2002 | Zeng | |
| 6,853,675 B1 * | 2/2005 | Oleynik | H04W 52/58 370/342 |
| 7,696,812 B2 | 4/2010 | Al-Shamma et al. | |
| 7,796,694 B1 * | 9/2010 | O'Connor | H04B 14/04 370/215 |
| 7,969,235 B2 | 6/2011 | Pan | |
| 8,379,755 B2 | 2/2013 | Cleveland | |
| 8,384,467 B1 | 2/2013 | O'Keeffe et al. | |
| 8,427,452 B2 | 4/2013 | Rai et al. | |
| 8,587,367 B1 | 11/2013 | Pan | |
| 8,743,067 B2 | 6/2014 | Chan et al. | |
| 9,304,625 B2 * | 4/2016 | Knausz | G06F 3/0418 |
| 2006/0158202 A1 * | 7/2006 | Umeda | G06K 9/0002 324/686 |
| 2006/0181446 A1 * | 8/2006 | Yu | H03L 7/193 341/143 |
| 2007/0064765 A1 * | 3/2007 | Solie | G01K 1/024 374/117 |
| 2009/0115473 A1 * | 5/2009 | Choi | H03L 7/0891 327/157 |

(Continued)

*Primary Examiner* — Darlene M Ritchie
(74) *Attorney, Agent, or Firm* — Patterson + Sheridan, LLP

(57) ABSTRACT

In an example, a processing system for an electronic device, such as a capacitive sensing device, includes a reservoir capacitor configured to store charge from a charge pump, and a control circuit configured to operate the charge pump at irregular intervals to transfer charge to the reservoir capacitor.

16 Claims, 4 Drawing Sheets

(56) References Cited

U.S. PATENT DOCUMENTS

| | | | |
|---|---|---|---|
| 2011/0042153 A1* | 2/2011 | Wu | G06F 3/0416 |
| | | | 178/18.06 |
| 2011/0133820 A1 | 6/2011 | Pan | |
| 2012/0287081 A1* | 11/2012 | Akai | G06F 3/044 |
| | | | 345/174 |
| 2013/0076648 A1 | 3/2013 | Krah et al. | |
| 2015/0109500 A1* | 4/2015 | Wang | H04N 5/3765 |
| | | | 348/294 |

* cited by examiner

RF EMISSION SPECTRUM RANDOMIZATION AND TARGETED NULLING FOR AN ELECTRONIC DEVICE

BACKGROUND

Field of the Disclosure

Embodiments of disclosure generally relate to electronic devices and, more particularly, to radio frequency (RF) emission spectrum randomization and targeting nulling for an electronic device.

Description of the Related Art

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

Radio frequency (RF) emission is a serious consideration in the design and operation of electronic devices, such as proximity sensor devices. A processing system for a proximity sensor device, such as a capacitive sensing device, can include one or more charge pumps. The charge pumps can be used, for example, to supply charge to reservoir capacitors used in a power supply circuit. A charge pump is one primary source of RF emission from a proximity sensor device. RF emission from the proximity sensor device can interfere with other devices near the proximity sensor device.

SUMMARY

Techniques for radio frequency emission spectrum randomization and targeted nulling for an electronic device, such as a capacitive sensing device, are described. In an embodiment, a processing system for a capacitive sensing device includes a reservoir capacitor configured to store charge from a charge pump, and a control circuit configured to operate the charge pump at irregular intervals to transfer charge to the reservoir capacitor.

In another embodiment, an input device for capacitive sensing includes sensing circuitry configured for coupling to sensor electrodes. The input device further includes a voltage supply coupled to the sensing circuitry, the voltage supply configured to provide a supply voltage to the sensing circuitry to operate the sensor electrodes, the voltage supply including a reservoir capacitor configured to store charge from a charge pump. The input device further includes a control circuit configured to operate the charge pump at irregular intervals to transfer charge to the reservoir capacitor.

In another embodiment, a method of operating a charge pump in a processing system for a capacitive sensing device includes storing charge from a charge pump in a reservoir capacitor, and operating the charge pump at irregular intervals to transfer charge to the reservoir capacitor.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

Figure 1:
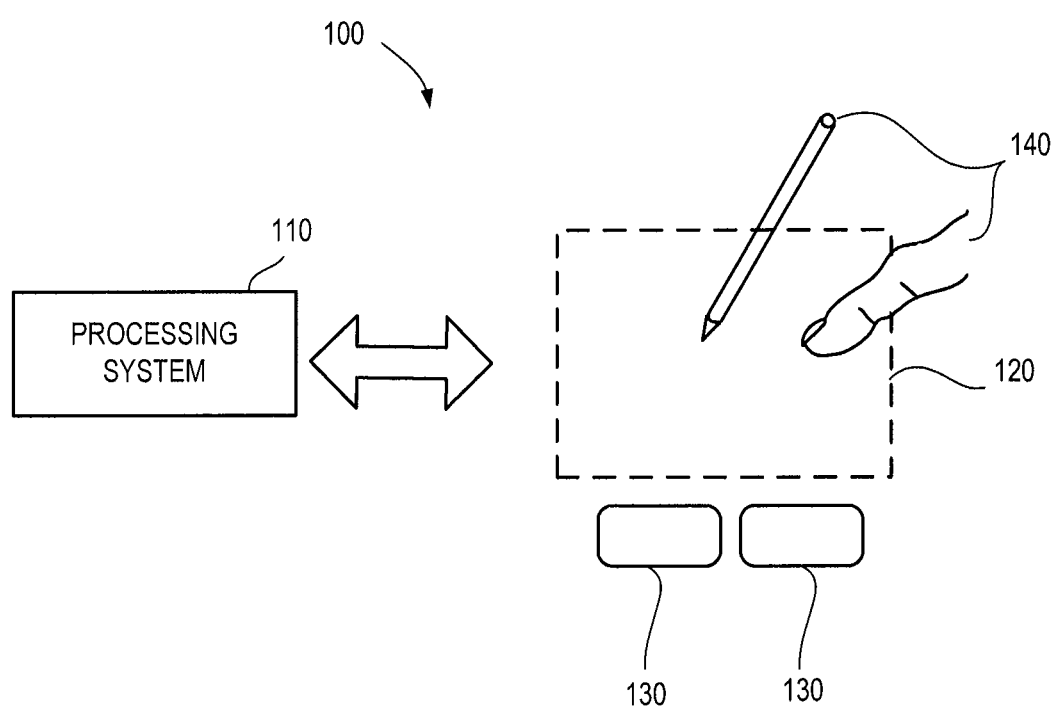
FIG. 1 is a block diagram of an exemplary input device, according to one embodiment described herein.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

FIG. 1 is a block diagram of an exemplary input device 100, in accordance with embodiments of the invention. The input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system, or can be physically separate from the electronic system. As appropriate, the input device 100 may communicate with parts of the electronic system using any one or more of the following: buses, networks, and other wired or wireless interconnections. Examples include I²C, SPI, PS/2, Universal Serial Bus (USB), Bluetooth, RF, and IRDA.

In FIG. 1, the input device 100 is shown as a proximity sensor device (also often referred to as a "touchpad" or a "touch sensor device") configured to sense input provided by one or more input objects 140 in a sensing region 120. Example input objects include fingers and styli, as shown in FIG. 1.

Sensing region 120 encompasses any space above, around, in and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g. a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 120 has a rectangular shape when projected onto an input surface of the input device 100.

The input device 100 may utilize any combination of sensor components and sensing technologies to detect user input in the sensing region 120. The input device 100 comprises one or more sensing elements for detecting user input. As several non-limiting examples, the input device 100 may use capacitive, elastive, resistive, inductive, magnetic, acoustic, ultrasonic, and/or optical techniques.

Some implementations are configured to provide images that span one, two, three, or higher dimensional spaces. Some implementations are configured to provide projections of input along particular axes or planes.

In some capacitive implementations of the input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g. system ground), and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals, and/or to one or more sources of environmental interference (e.g. other electromagnetic signals). Sensor electrodes may be dedicated transmitters or receivers, or may be configured to both transmit and receive.

In FIG. 1, a processing system 110 is shown as part of the input device 100. The processing system 110 is configured to operate the hardware of the input device 100 to detect input in the sensing region 120. The processing system 110 comprises parts of or all of one or more integrated circuits (ICs) and/or other circuitry components. For example, a processing system for a mutual capacitance sensor device may comprise transmitter circuitry configured to transmit signals with transmitter sensor electrodes, and/or receiver circuitry configured to receive signals with receiver sensor electrodes). In some embodiments, the processing system 110 also comprises electronically-readable instructions, such as firmware code, software code, and/or the like. In some embodiments, components composing the processing system 110 are located together, such as near sensing element(s) of the input device 100. In other embodiments, components of processing system 110 are physically separate with one or more components close to sensing element(s) of input device 100, and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g. to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120, or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 overlaps at least part of an active area of a display screen. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing. As another example, the display screen may be operated in part or in total by the processing system 110.

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media readable by the processing system 110). Additionally, the embodiments of the present invention apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 2:
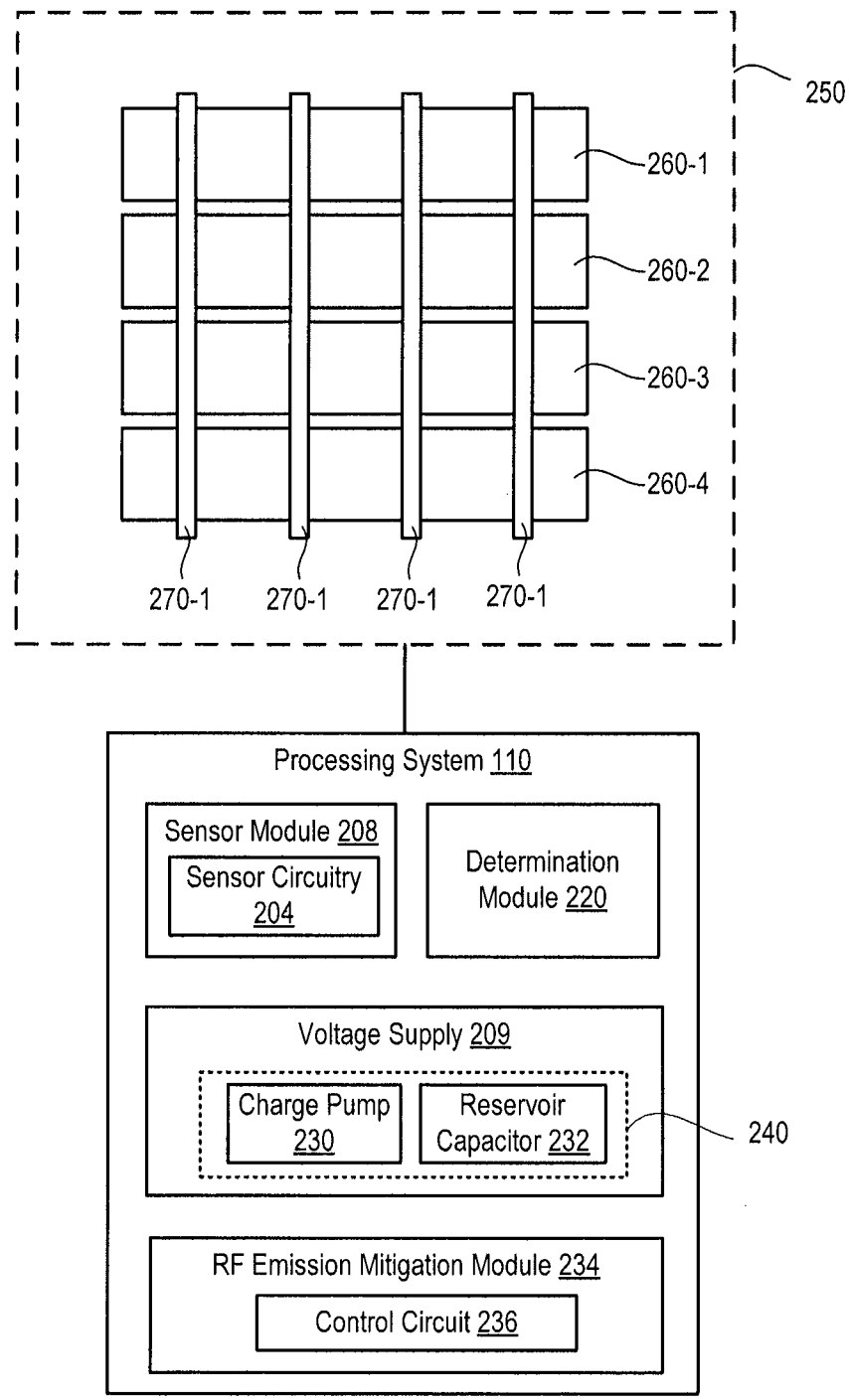
FIG. 2 is a block diagram depicting an embodiment of processing system coupled to a pattern of sensing elements.

FIG. 2 is a block diagram depicting an embodiment of the processing system 110 coupled to a pattern 250 of sensing elements. For clarity of illustration and description, FIG. 2 shows the sensing elements in a pattern of simple rectangles and does not show various components, such as various interconnects between the sensing elements and the processing system 110. An electrode pattern 250 comprises a first plurality of sensor electrodes 260 (260-1, 260-2, 260-3, . . . 260-$n$), and a second plurality of sensor electrodes 270 (270-1, 270-2, 270-3, . . . 270-$m$) disposed over the first plurality of electrodes 260. In the example shown, n=m=4, but in general n and m are each positive integers and not necessarily equal to each other. In various embodiments, the first plurality of sensor electrodes 260 are operated as a plurality of transmitter electrodes (referred to specifically as "transmitter electrodes 260"), and the second plurality of sensor electrodes 270 are operated as a plurality of receiver electrodes (referred to specifically as "receiver electrodes 270"). In another embodiment, one plurality of sensor electrodes may be configured to transmit and receive and the other plurality of sensor electrodes may also be configured to transmit and receive. The first plurality of sensor electrodes 260, the second plurality of sensor electrodes 270, or both can be disposed within the sensing region 120. The electrode pattern 250 can be coupled to the processing system 110.

The first plurality of electrodes 260 and the second plurality of electrodes 270 are typically ohmically isolated from each other. That is, one or more insulators separate the first plurality of electrodes 260 and the second plurality of electrodes 270 and prevent them from electrically shorting to each other. In some embodiments, the first plurality of electrodes 260 and the second plurality of electrodes 270 are separated by insulative material disposed between them at cross-over areas; in such constructions, the first plurality of electrodes 260 and/or the second plurality of electrodes 270 can be formed with jumpers connecting different portions of the same electrode. In some embodiments, the first plurality of electrodes 260 and the second plurality of electrodes 270 are separated by one or more layers of insulative material. In such embodiments, the first plurality of electrodes 260 and the second plurality of electrodes 270 can be disposed on separate layers of a common substrate. In some other embodiments, the first plurality of electrodes 260 and the second plurality of electrodes 270 are separated by one or more substrates; for example, the first plurality of electrodes 260 and the second plurality of electrodes 270 can be disposed on opposite sides of the same substrate, or on different substrates that are laminated together. In some embodiments, the first plurality of electrodes 260 and the second plurality of electrodes 270 can be disposed on the same side of a single substrate.

The areas of localized capacitive coupling between the first plurality of sensor electrodes 260 and the second plurality sensor electrodes 270 may be form "capacitive pixels" of a "capacitive image." The capacitive coupling between sensor electrodes of the first and second pluralities 260 and 270 changes with the proximity and motion of input objects in the sensing region 120. Further, in various embodiments, the localized capacitive coupling between each of the first plurality of sensor electrodes 260 and the second plurality of sensor electrodes 270 and an input object may be termed "capacitive pixels" of a "capacitive image." In some embodiments, the localized capacitive coupling between each of the first plurality of sensor electrodes 260 and the second plurality of sensor electrodes 270 and an input object may be termed "capacitive measurements" of "capacitive profiles."

The processing system 110 can include a sensor module 208 having sensor circuitry 204. The sensor module 208 operates the electrode pattern 250 to receive resulting signals from electrodes in the electrode pattern using a capacitive sensing signal having a sensing frequency. The processing system 110 can include a determination module 220 configured to determine capacitive measurements from the resulting signals. The determination module 220 can track changes in capacitive measurements to detect input object(s) in the sensing region 120. The processing system 110 can include other modular configurations, and the functions performed by the sensor module 208 and the determination module 220 can, in general, be performed by one or more modules in the processing system 110. The processing system 110 can include modules, and can perform other functions as described in some embodiments below.

The processing system 110 can operate in absolute capacitive sensing mode or transcapacitive sensing mode. In absolute capacitive sensing mode, receiver(s) in the sensor circuitry 204 measure voltage, current, or charge on sensor electrode(s) in the electrode pattern 250 while the sensor electrode(s) are modulated with absolute capacitive sensing signals to generate the resulting signals. The determination module 220 generates absolute capacitive measurements from the resulting signals. The determination module 220 can track changes in absolute capacitive measurements to detect input object(s) in the sensing region 120.

In transcapacitive sensing mode, transmitter(s) in the sensor circuitry 204 drive one or more of the first plurality of electrodes 260 with the capacitive sensing signal (also referred to as a transmitter signal or modulated signal in the transcapacitive sensing mode). Receiver(s) in the sensor circuitry 204 measure voltage, current, or charge on one or more of the second plurality of electrodes 270 to generate the resulting signals. The resulting signals comprise the effects of the capacitive sensing signal and input object(s) in the sensing region 120. The determination module 220 generates transcapacitive measurements from the resulting signals. The determination module 220 can track changes in transcapacitive measurements to detect input object(s) in the sensing region 120.

In some touch screen embodiments, at least one of the first plurality of sensor electrodes 260 and the second plurality of sensor electrodes 270 comprise one or more display electrodes of a display device used in updating a display of a display screen, such as one or more segments of a "Vcom" electrode (common electrodes), gate electrodes, source electrodes, anode electrode and/or cathode electrode. These display electrodes may be disposed on an appropriate display screen substrate. For example, the display electrodes may be disposed on a transparent substrate (a glass substrate, TFT glass, or any other transparent material) in some display screens (e.g., In Plane Switching (IPS) or Plane to Line Switching (PLS) Organic Light Emitting Diode (OLED)), on the bottom of the color filter glass of some display screens (e.g., Patterned Vertical Alignment (PVA) or Multi-domain Vertical Alignment (MVA)), over an emissive layer (OLED), etc. The display electrodes can also be referred to as "combination electrodes," since the display electrodes perform functions of display updating and capacitive sensing. In various embodiments, each sensor electrode of the first and second plurality of sensor electrodes 260 and 270 comprises one or more combination electrodes. In other embodiments, at least two sensor electrodes of the first plurality of sensor electrodes 260 or at least two sensor electrodes of the second plurality of sensor electrodes 270 may share at least one combination electrode. Furthermore, in one embodiment, both the first plurality of sensor electrodes 260 and the second plurality of electrodes 270 are disposed within a display stack on the display screen substrate. Additionally, at least one of the sensor electrodes 260, 270 in the display stack may comprise a combination electrode. However, in other embodiments, only the first plurality of sensor electrodes 260 or the second plurality of sensor electrodes 270 (but not both) are disposed within the display stack, while other sensor electrodes are outside of the display stack (e.g., disposed on an opposite side of a color filter glass).

In an embodiment, the processing system 110 comprises a single integrated controller, such as an application specific integrated circuit (ASIC), having the sensor module 208, the determination module 220, and any other module(s). In another embodiment, the processing system 110 can include a plurality of integrated circuits, where the sensor module 208, the determination module 220, and any other module(s) can be divided among the integrated circuits. For example, the sensor module 208 can be on one integrated circuit, and the determination module 220 and any other module(s) can be on one or more other integrated circuits. In some embodiments, a first portion of the sensor module 208 can be on one integrated circuit and a second portion of the sensor module 208 can be on second integrated circuit. In such embodiments, at least one of the first and second integrated circuits comprises at least portions of other modules such as a display driver module and/or a display driver module.

The processing system 110 can be coupled to other types of sensor electrode patterns. In an embodiment, the processing system 110 can be coupled to a matrix of sensor electrodes. For example, the processing system 110 can be coupled to a rectangular matrix of sensor electrodes, although other patterns can be employed, such as polar arrays, repeating patterns, non-repeating patterns, non-uniform arrays, a single row or column, or other suitable arrangement. Further, the sensor electrodes may be any shape, such as circular, rectangular, diamond, star, square, noncovex, convex, nonconcave concave, etc. Further, the sensor electrodes may be sub-divided into a plurality of distinct sub-electrodes.

The processing system 110 includes a voltage supply 209 and a radio frequency (RF) emission mitigation module 234. The voltage supply 209 includes a DC-DC converter 240 having a charge pump 230 and a reservoir capacitor 232. The RF emission mitigation module 234 includes a control circuit 236.

In operation, the DC-DC converter 240 converts an input DC voltage to a (typically higher) output DC voltage. The output DC voltage can be used by other circuits in the processing system 110, such as the sensor circuitry 204. The DC-DC converter 240 activates and deactivates the charge pump 230 to supply charge to the reservoir capacitor 232 over time. If the charge pump 230 is activated periodically in regular intervals, then the current flowing into the reservoir capacitor will be a periodic waveform. The electromagnetic (EM) spectrum of the periodic current waveform will be a series of tones. The EM radiation from the charge pump 230 can interfere with other circuitry of the input device 100 or electronic system having the input device 100. For example, if the input device 100 is part of a mobile device, the EM radiation from the charge pump 230 can interface with the wireless circuitry of the mobile device.

In an embodiment, the RF emission mitigation module 234 is configured to shape the emission spectrum of charge pump 230 to have desired characteristics. The shaping is achieved by configuring the control circuit 236 to operate the charge pump 230 at irregular intervals to transfer charge to the reservoir capacitor 232. In an embodiment, the irregular intervals are comprised of partially-random, pseudorandom or random intervals. The irregular intervals can be configured to reduce the peaks (tones) in the spectrum (i.e. randomize the spectrum), and, simultaneously or independently, to create nulls in the RF emission spectrum from the charge pump 230 at one or multiple frequencies.

Figure 3:
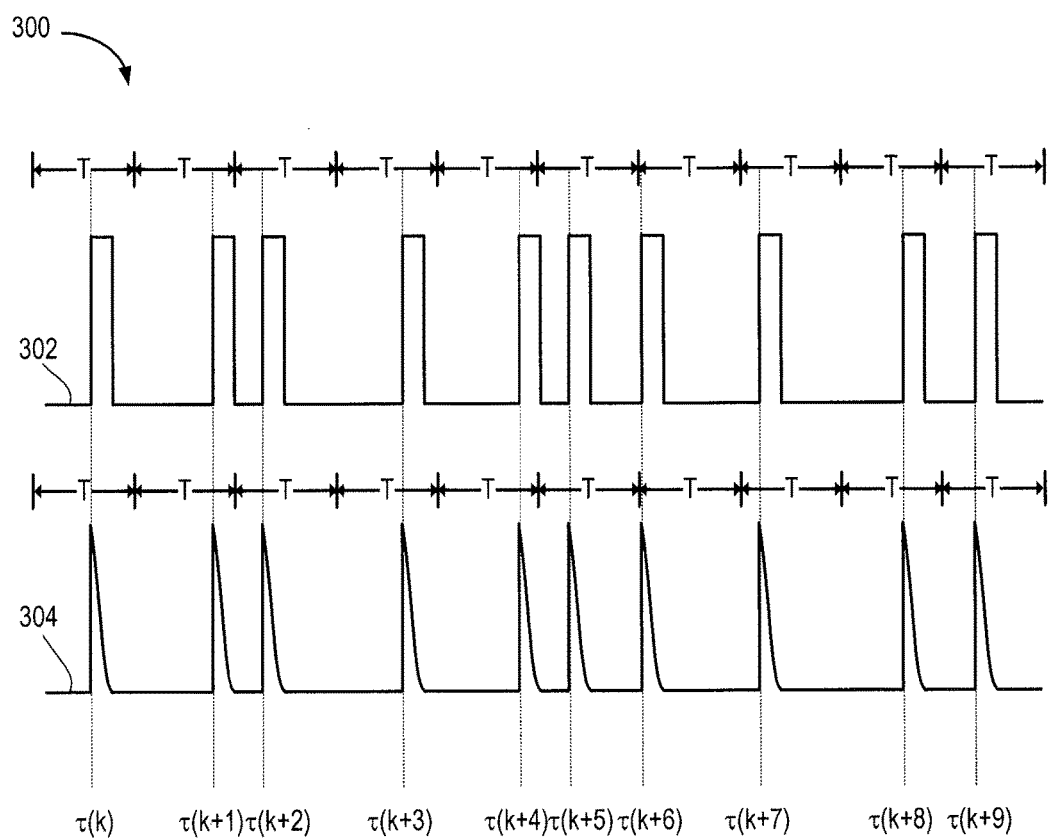
FIG. 3 is a graph depicting operation of a charge pump at irregular intervals.

FIG. 3 is a graph 300 depicting operation of the charge pump 230 at irregular intervals. A plot 302 shows an enable signal generated by the control circuit 236 to enable the charge pump 230. A plot 304 shows the current generated by the charge pump 230 as controlled by the control circuit 236. As shown, the current generated by the charge pump 230 spikes when the enable signal generated by the control circuit 236 goes from a low value to a high value. When the enable signal is at the low value, the control circuit 236 disables the charge pump 230 and the charge pump 230 does not generate current.

As shown, the control circuit 236 enables the charge pump 230 once every interval (T). Thus, the charge pump 230 is activated once every T seconds. This ensures that the average charge delivered to the reservoir capacitor 232 is constant and allows the ripple on the voltage supply output to be at a specified value or within a range of values. However, the instance when the charge pump 230 is enabled within each interval T is randomized. Randomizing the instance when the charge pump 230 is activated within each interval T breaks up the regularity of the pumping operation and allows for randomization and nulling in the EM emission spectrum of the charge pump 230.

In a first interval, the control circuit 236 enables the charge pump 230 at time $\tau(k)$. In a second interval, the control circuit 236 enables the charge pump 230 at a time $\tau(k+1)$. In a third interval, the control circuit 236 enables the charge pump 230 at a time $\tau(k+2)$. The example shows ten intervals and thus in a tenth interval, the control circuit 236 enables the charge pump 230 at a time $\tau(k+9)$. The time within each interval T in which the control circuit 236 enables the charge pump 230 differs irregularly from one interval to the next.

In real world systems and applications, a charge pump's turn-on instances $\tau(k)$ will often be integer multiples of some fundamental system clock period. So $\tau(k)$ can often be represented as an integer, and, therefore, sequence { ... $\tau(k)$ $\tau(k+1)$ $\tau(k+2)$ ... } can be represented as a binary bit streams. In the following portion of the application, a specific example of such a bit stream can be considered as and will be called a "code". When the sequence { ... $\tau(k)$ $\tau(k+1)$ $\tau(k+2)$ ... } is partially-random or pseudorandom, the corresponding code is a partially-random or pseudorandom code, and vice versus.

The control circuit 236 can operate the charge pump 230 at irregular intervals based on locally repeated bit patterns. In an embodiment, the code is comprised of pseudorandom binary n-tuples (i.e. groups of n pseudorandom random bits) which are repeated consecutively once or more in the code.

As described above, the control circuit 236 can use a PN code with a locally repeated pattern to modulate the enable signal for enabling the charge pump 230. Let $\{a_k\}$ be an arbitrary (e.g., random) bit stream. Let a charge pump enable signal code $\{b_k\}$ be generated from $\{a_k\}$ as follows:

$$b_{2np+k} = b_{(2n+1)p+k} = a_{np+k} \qquad \text{Eq.1}$$

for all $n \in [-\infty, \infty]$ and $k=0, 1, \ldots, p-1$, where p is a positive integer. The sequence $\{b_k\}$ can be constructed from $\{a_k\}$ by grouping $\{a_k\}$'s bits in a group of p and repeating each p-bit group once and only once. The following example illustrates the construction:

if $\{a_k\}=\{$ ... 0101110011110000110101011 ... $\}$
then $\{b_k\}=\{$ ... 01011100 01011100 11100001 11100001 10101011 10101011 ... $\}$.

In this example, p=8, but p can have other values. Such locally repeating bit patterns are referred to herein as "local twins" and the code generated with such a pattern is referred to as a "local twin code."

The code $\{b_k\}$ with this kind of local twin pattern will result in a series of nulls in the EM spectrum of the charge pump 230. In particular, the EM spectrum of the charge pump 320 will have nulls at frequencies (targeted nulls):

$$F = \frac{2m+1}{2p} \times \frac{1}{H} \qquad \text{Eq. 2}$$

where H is the duration of one charge pump pumping operation, p is the number of the length-H charge pump pumping intervals whose pattern is to be repeated, and m is an arbitrary integer. Notably, the frequencies at which nulls occur are not dependent on the details of the charge pump current waveform or $\{a_k\}$. By selecting m, p, and H, nulls can be created at one or more frequencies.

In some embodiments, the targeted nulls can be shifted during operation. For example, the control circuit 236 can use a PN code that targets a null at a first frequency, and then use another PN code that targets a null at a second frequency. The first frequency can be associated with operation of a mobile device using a first wireless protocol (e.g., LTE), and the second frequency can be associated with operation of the mobile device using a second wireless protocol (e.g., 4G). In summary, because the frequencies of the nulls are set by the parameters of the codes rather than the circuits of the charge pump or controller, the scheme is capable of nulling the RF emission spectrum adaptively and in real time.

As noted above, to properly balance the output load current and maintain low ripple on the voltage supply, the charge pump 230 should be activated once every T seconds.

That is, there should be one and only one enable pulse in each interval T. This can be realized by grouping the bits in $\{a_k\}$ into groups of N, where N is the number of subintervals in each interval T, and by assigning the value of "1" to one bit and one bit only in each group of N bits. That is, of each N bits, N−1 bits will be "0" and only one bit will be "1". This kind of pattern is referred to herein as a 1-in-N bit pattern. A bit stream comprising 1-in-N bit patterns is referred to as a 1-in-N bit stream.

Since $\{b_k\}$ is formed by the repetition of p bits long patterns from $\{a_k\}$, by making p an integer multiple of N, the repeated p-bit pattern will contain an integer number of 1-in-N patterns. Thus, $\{b_k\}$ will also be a 1-in-N bit stream. The following is an example of a 1-in-N bit pattern bit streams:

$\{a_k\}$={ . . . 0100 0001 1000 0010 0100 1000 . . . }
$\{b_k\}$={ . . . 0100 0001 1000 0010 0100 1000 0100 0001 1000 0010 0100 1000 . . . }

In this example, N=4 and p=8, but N and p can have other values. Note that, in each 1-in-N bit pattern in $\{a_k\}$, there are N possible ways to assign the "1" bit. This degree of freedom can be exploited to randomize the EM spectrum of the charge pump 230.

Typically, the tones in the EM spectrum of the charge pump 230 are associated with periodic patterns in the time domain waveform. By employing the enable bit stream that is devoid of any periodicity, the tones in the EM spectrum can be generally eliminated. As discussed above, because the degree of freedom in choosing the "1" bit in each 1-in-N pattern in $\{a_k\}$, the "1" bit in $\{a_k\}$'s sequence of 1-in-N patterns can be randomly selected. The resulting enable bit stream $\{b_k\}$, and consequently the current waveform of the charge pump 230, will be devoid of periodicity. This results in the complete randomization of the EM spectrum of the charge pump 230.

The above enable bits stream $\{b_k\}$ only relies on repeated neighboring bit patterns. There is no mathematical relationship required between any two pairs of "twins." Any two pairs of "twins" should be completely uncorrelated in order to randomize the spectrum. Thus, the code can be generated one twin pattern at a time. This reduces memory requirements of the control circuit 236.

Figure 4:
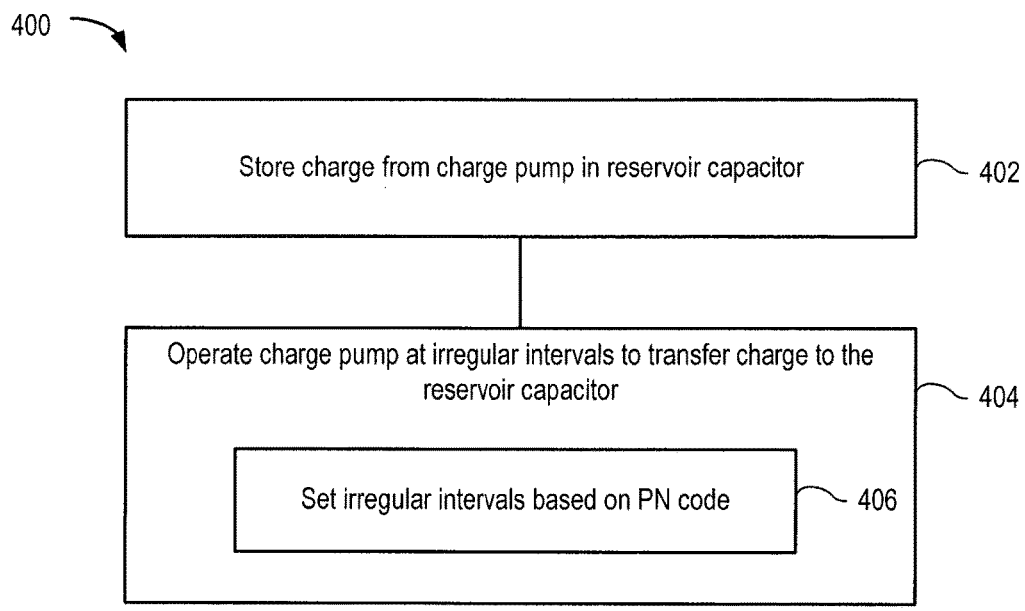
FIG. 4 is a flow diagram depicting a method of operating a charge pump in a processing system for a capacitive sensing device according to an embodiment.

FIG. 4 is a flow diagram depicting a method 400 of operating a charge pump in a processing system for a capacitive sensing device according to an embodiment. The method 400 begins at step 402, where the charge pump 230 stores charge in the reservoir capacitor 232. At step 404, the control circuit 236 operates the charge pump 230 at irregular intervals to transfer charge to the reservoir capacitor 232. Step 404 can include step 406, where the control circuit 236 sets the irregular intervals based on a PN code. In some embodiments, the PN code comprises a bit stream $\{b_k\}$ as described above.

As described above, the charge pump 230 can be operated at irregular intervals to eliminate tones located at harmonics of the charge pump clock frequencies and generating spectral nulls at one or more selected frequencies. In other embodiments, RF emissions can be reduced from other types of circuits using the scheme described herein. For example, irregular operation can be used to drive transmitter electrodes in a capacitive sensing device to reduce EM emissions caused by driving the transmitter electrodes with modulated signals.

The embodiments and examples set forth herein were presented in order to best explain the embodiments in accordance with the present technology and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

In view of the foregoing, the scope of the present disclosure is determined by the claims that follow.

We claim:

1. A processing system for a capacitive sensing device, comprising:
    a reservoir capacitor configured to store charge output from a charge pump; and
    a control circuit configured to generate an enable signal to enable and disable the charge pump at irregular intervals to transfer charge to the reservoir capacitor, where the charge pump outputs charge when enabled and does not output charge when disabled, and where the control circuit modulates the enable signal using a pseudorandom (PN) code formed by dividing a first bit sequence into equal-length portions and generating a second bit sequence having pairs of the equal-length portions.

2. The processing system of claim 1, wherein the irregular intervals are configured to reduce the peaks in a radio frequency (RF) emission spectrum of the charge pump.

3. The processing system of claim 1, wherein the first bit sequence is $\{a_k\}$ and the second bit sequence is $\{b_k\}$, where $b_{2np+k}=b_{(2n+1)p+k}=a_{np+k}$ for all $n \in [-\infty, \infty]$ and k=0, 1, . . . , p−1, where p is a positive integer and the length of each equal-length portion.

4. The processing system of claim 3, wherein the irregular intervals are configured to introduce one or more nulls in a radio frequency (RF) emission spectrum from the charge pump at a respective one or more frequencies.

5. The processing system of claim 4, wherein each of the one or more frequencies is inversely proportional to the length of each equal-length portion.

6. The processing system of claim 5, wherein each of the one or more frequencies satisfies $((2m+1)/2p)*(1/H)$, where H is a duration the charge pump is enabled, p is the length of each equal-length portion, and m is an arbitrary integer.

7. An input device for capacitive sensing, comprising:
    sensing circuitry configured for coupling to sensor electrodes;
    a voltage supply coupled to the sensing circuitry, the voltage supply configured to provide a supply voltage to the sensing circuitry to operate the sensor electrodes, the voltage supply including a reservoir capacitor configured to store charge output from a charge pump; and
    a control circuit configured generate an enable signal to enable and disable the charge pump at irregular intervals to transfer charge to the reservoir capacitor, where the charge pump outputs charge when enabled and does not output charge when disabled, and where the control circuit modulates the enable signal using a pseudorandom (PN) code formed by dividing a first bit sequence into equal-length portions and generating a second bit sequence having pairs of the equal-length portions.

8. The input device of claim 7, wherein the irregular intervals are configured to reduce peaks in radio frequency (RF) emission spectrum from the charge pump.

9. The input device of claim 7, wherein the first bit sequence is $\{a_k\}$ and the second bit sequence is $\{b_k\}$, where $b_{2np+k}=b_{(2n+1)p+k}=a_{np+k}$ for all $n \in [-\infty, \infty]$ and k=0, 1, . . . , p−1, where p is a positive integer and the length of each equal-length portion.

10. The input device of claim 7, wherein the irregular intervals are configured to introduce one or more nulls in a radio frequency (RF) emission spectrum from the charge pump at a respective one or more frequencies.

11. The input device of claim 10, wherein each of the one or more frequencies is inversely proportional to the length of each equal-length portion.

12. The input device of claim 11, wherein the each of the one or more frequencies satisfies $((2m+1)/2p)*(1/H)$, where H is a duration the charge pump is enabled, p is the length of each equal-length portion, and m is an arbitrary integer.

13. A method of operating a charge pump in a processing system for a capacitive sensing device, comprising:
   storing charge output from a charge pump in a reservoir capacitor; and
   enabling and disabling the charge pump at irregular intervals to transfer charge to the reservoir capacitor, where the charge pump outputs charge when enabled and does not output charge when disabled, and where the enabling and disabling of the charge pump is based on a pseudorandom (PN) code formed by dividing a first bit sequence into equal-length portions and generating a second bit sequence having pairs of the equal-length portions.

14. The method of claim 13, wherein the first bit sequence is $\{a_k\}$ and the second bit sequence is $\{b_k\}$, where $b_{2np+k} = b_{(2n+1)p+k} = a_{np+k}$ for all $n \in [-\infty, \infty]$ and $k = 0, 1, \ldots, p-1$, where p is a positive integer and the length of each equal-length portion.

15. The method of claim 13, wherein the irregular intervals are configured to introduce one or more nulls in a radio frequency (RF) emission spectrum from the charge pump at a respective one or more frequencies.

16. The method of claim 15, wherein each of the one or more frequencies is inversely proportional to the length of each equal-length portion.

* * * * *